(12) United States Patent  
Ordonio, Jr. et al.

(10) Patent No.: US 7,399,024 B2
(45) Date of Patent: Jul. 15, 2008

(54) VEHICLE DEFLECTOR ASSEMBLY

(75) Inventors: Anthony Ordonio, Jr., Dublin, OH (US); Shawn L. Tarr, Dublin, OH (US); Brooks Marquette, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 11/272,236

(22) Filed: Nov. 10, 2005

(65) Prior Publication Data

US 2006/0108830 A1 May 25, 2006

Related U.S. Application Data

(60) Provisional application No. 60/627,699, filed on Nov. 12, 2004.

(51) Int. Cl.
*B60J 1/20* (2006.01)
(52) U.S. Cl. .................................... 296/180.1
(58) Field of Classification Search .... 296/180.1–180.5
See application file for complete search history.

(56) References Cited

U.S. PATENT DOCUMENTS

| 4,159,843 A | 7/1979 | Crossman |
| 4,652,036 A | 3/1987 | Okamoto et al. |
| 4,707,014 A | 11/1987 | Rich |
| 4,819,132 A | 4/1989 | Hwan et al. |
| D305,017 S | 12/1989 | Lund |
| 5,013,081 A | 5/1991 | Cronce et al. |
| 5,240,536 A | 8/1993 | Kurobe |
| 5,603,549 A | 2/1997 | Chen et al. |
| 5,918,929 A | 7/1999 | Vagis |
| 6,126,229 A | 10/2000 | Lund |
| 6,183,041 B1 | 2/2001 | Wilson |
| 6,431,639 B2 | 8/2002 | Yoon |
| 6,874,842 B2 * | 4/2005 | Hojna ..................... 296/180.1 |

* cited by examiner

*Primary Examiner*—H Gutman
(74) *Attorney, Agent, or Firm*—Mark E. Duell; Fay Sharpe LLP (57) ABSTRACT

A vehicle deflector assembly includes a first member and second member with at least one of the first and second members secured to an associated vehicle. Both the first and second members extend along a substantial portion of a width of the vehicle. A connecting assembly connects the first and second members together while allowing relative thermal expansive movement therebetween.

27 Claims, 11 Drawing Sheets

VEHICLE DEFLECTOR ASSEMBLY

This application claims priority of Provisional Patent Application Ser. No. 60/627,699, filed Nov. 12, 2004, entitled "Vehicle Deflector Assembly".

BACKGROUND

The present disclosure relates to a vehicle deflector assembly. In one embodiment, the vehicle deflector assembly is mounted to the rear roof portion of a sport utility truck and will be described with particular reference thereto. It is to be appreciated, however, that the vehicle deflector assembly may relate to other similar environments and applications.

Vehicles having load-carrying beds often suffer from poor air flow dynamics. Typically, this is at least partially caused by the vertical nature of the passenger cabin in these vehicles abutting an open-ended load-carrying bed which is often positioned at a level far below the roof of the passenger cabin. Design constraints further exacerbate or contribute to such airflow problems. For example, it is often desirable to maximize interior passenger cabin space as well as the size of the load-carrying bed. The result of maximizing these portions of the vehicle is the passenger cabin towers over the bed and a substantially vertical wall is utilized between the cabin and the bed. The draft force created by the passenger cabin forward of the load-carrying bed, particularly as the vehicle travels at increasing speeds, becomes turbulent as it flows off the roof and into or over the load-carrying bed.

Another problem with vehicles having load-carrying beds is that they are sometimes viewed as being too "boxy" by their owners and potential purchasers. The abrupt termination of the passenger cabin at the intersection with the load-carrying bed provides limited options for presenting a streamlined appearance along the length of such vehicles. To counter these problems, numerous types of air deflectors (sometimes referred to as spoilers) and cab fairings have been proposed to decrease the draft effect and better direct airflow over the cab. Such devices can additionally reduce air turbulence within the load-carrying bed and protect cargo carried therein, as well as provide vehicles with a more streamlined appearance, considered desirable by many owners and potential purchasers.

Despite the numerous types of air deflectors and fairings available, there remains a need for an air deflector assembly that is relatively easier to assemble during the manufacture of a vehicle with a load-carrying bed. Additional desirable attributes include providing decent airflow dynamics for air flowing over the passenger cabin and entering the load-carrying bed portion of the vehicle and improved aesthetics to the vehicle.

BRIEF SUMMARY

In accordance with one aspect, a vehicle deflector assembly is provided. More particularly, in accordance with this aspect, the vehicle deflector assembly includes a first member and second member with at least one of the first and second members secured to an associated vehicle. Both the first and second members extend along a substantial portion of a width of the vehicle. A connecting assembly connects the first and second members together while allowing relative thermal expansive movement therebetween.

In accordance with another aspect, a vehicle deflector assembly mounted on the roof of a vehicle is provided for directing airflow over a load-carrying bed portion of the vehicle. More particularly, in accordance with this aspect, the deflector assembly includes an upper member mounted to the roof of the vehicle and having a groove defined along one end thereof. A lower member has a tongue defined along one end thereof that is receivable in the groove for connecting the lower member to the upper member. A plurality of bosses extend from and are spaced along a longitudinal length of the tongue. The bosses are receivable in corresponding slots defined in the upper member adjacent the groove. At least one of the bosses and the grooves is progressively dimensioned toward lateral edges of the upper and lower members.

In accordance with still another aspect, a rear roof garnish assembly is provided. More particularly, in accordance with this aspect, the rear roof garnish assembly includes an upper member secured to a rear portion of vehicle's roof and a lower member. A connecting means secures the lower member to the upper member. The connecting means includes a tongue section formed along an edge of one of the upper member and the lower member. A groove section defines a groove formed along an edge of the other of the upper member and the lower member. The groove receives the tongue section therein. Raised bosses are formed on one of the tongue section and the groove section. Slots are formed in the other of the tongue section and the groove section that receive the raised bosses.

DETAILED DESCRIPTION

Figure 1:
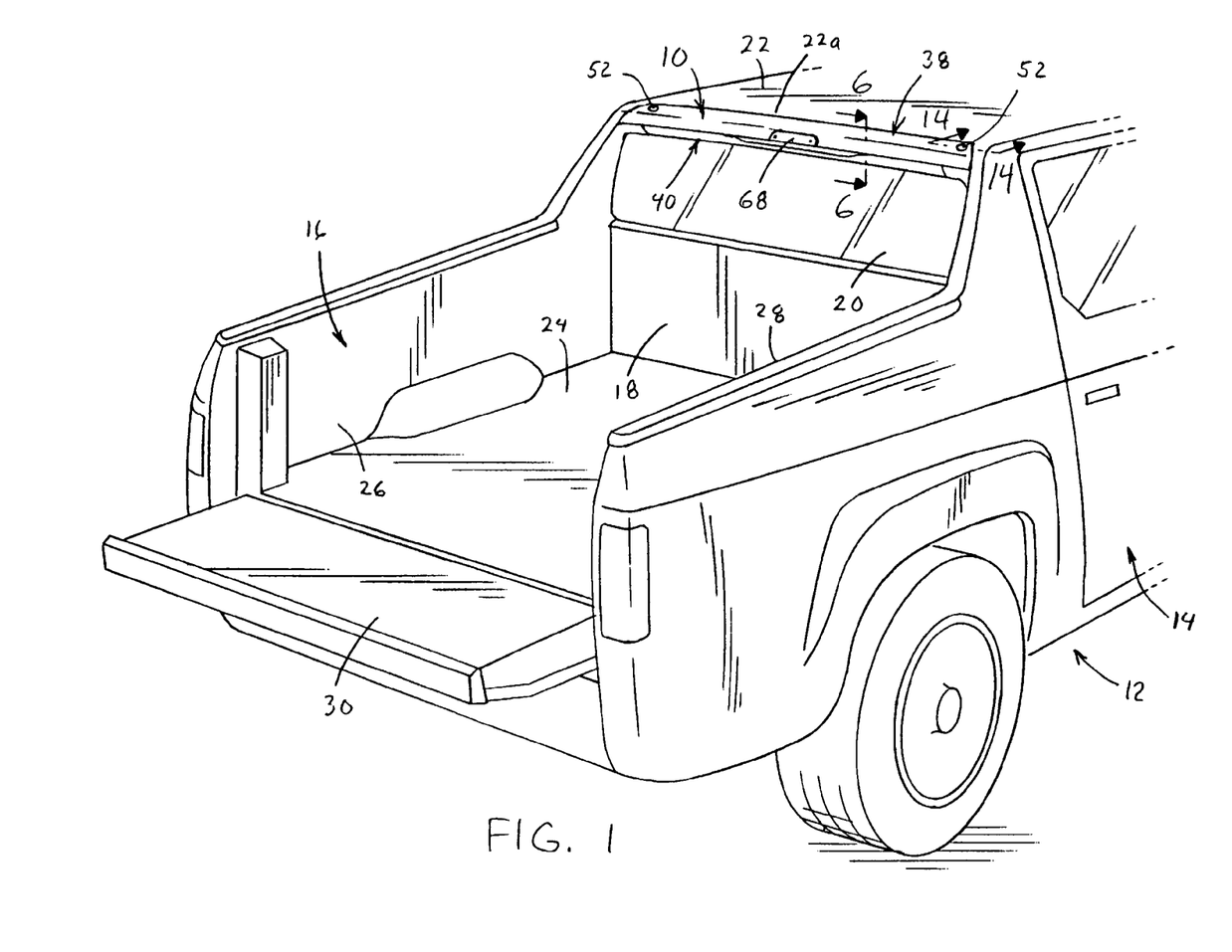
FIG. 1 is a perspective view of a vehicle deflector assembly mounted to a rear portion of a sport utility truck's roof.

Referring now to the drawings wherein the showings are for purposes of illustrating one or more embodiments only and not for purposes of limiting the same, FIG. 1 shows a vehicle deflector assembly 10 mounted to a vehicle 12. In the illustrated embodiment, the vehicle is a sport utility truck (SUT), but it is to be appreciated by those skilled in the art that the vehicle 12 could alternately be any other type of vehicle to which it is desirable to mount the deflector assembly 10. The SUT vehicle 12 generally includes a cab portion 14 and a load-carrying bed portion 16. A wall 18 including rear window 20 generally divides and partially defines the cab portion 14 and the bed portion 16. The cab portion 14 is further defined by roof 22 to which the deflector assembly 10 is mounted adjacent the window 20. The bed portion 16 is further defined by bed floor 24, walls 26,28 extending upward from lateral edges of the bed floor and tailgate 30.

Figure 2:
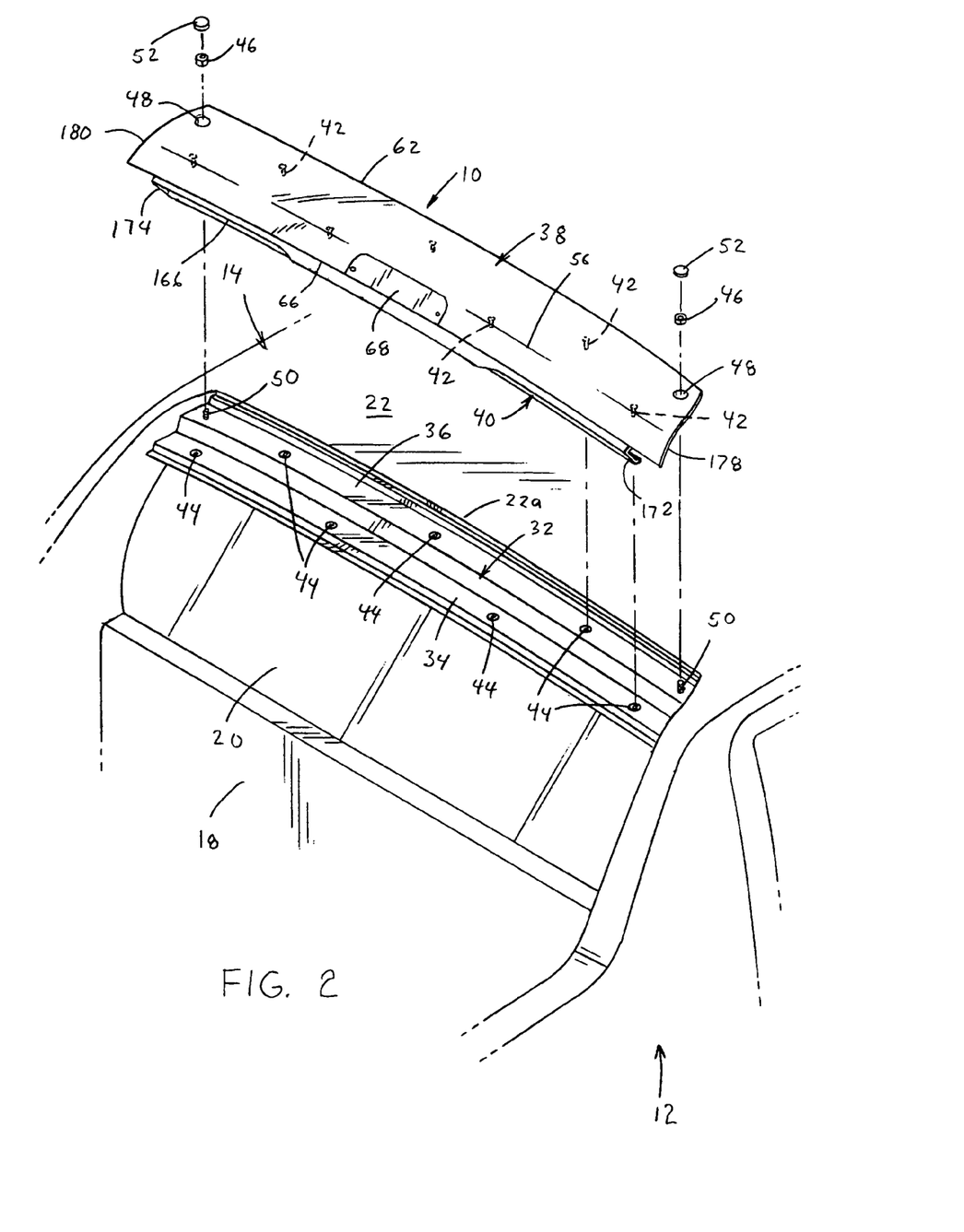
FIG. 2 is an exploded assembly view showing the deflector assembly removed from the sport utility truck.
Figure 3:
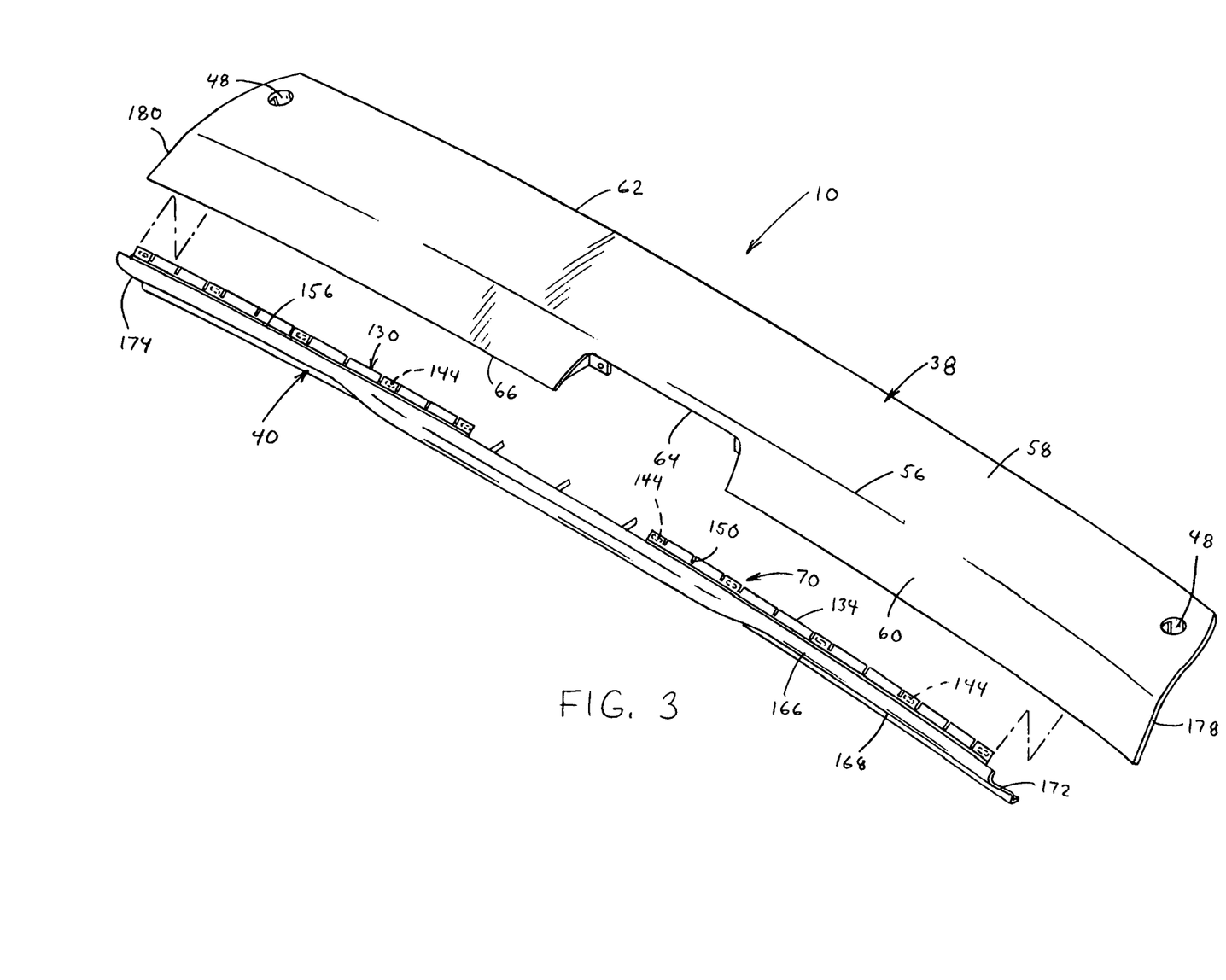
FIG. 3 is an exploded perspective view of the vehicle deflector assembly separately showing a vehicle deflector upper member and a vehicle deflector lower member.

More specifically, with additional reference to FIGS. 2 and 3, the deflector assembly 10 is mounted to a rear portion 22a of the roof adjacent or at an intersection between the rear wall 18 of the cab portion 14 and the roof 22. The rear portion 22a includes a stepped section 32 into which the deflector assembly 10 mounts. The stepped section 32 includes first and second steps 34,36 to which a first or upper member 38 of the deflector assembly is mounted. The upper member 38, with a second or lower member 40 of the deflector assembly secured thereto, is mounted to the stepped section 32 by a plurality of fasteners 42 received in fastener openings 44 defined in the steps 34,36. Other fasteners, such as nuts 46, are also used to mount the upper member 38 to the stepped section 32. Studs 50 pass through throughholes 48 in upper member 38 and threadedly engage nuts 46. Caps 52 are also received in throughholes 48 to cover the nuts 46 and provide improved aesthetics to the mounted upper member 38.

The upper and lower members 38,40 generally extend along a substantial portion of the width of the vehicle 12 and, more particularly, the vehicle's roof 22. The members 38,40 can be separately formed and/or formed of different materials, e.g., the upper member can be formed and painted to match the color of the vehicle 12 and the bottom member 40 can be molded in black which eliminates the need for masking. With particular reference to FIG. 3, the upper member 38 includes an apex 56 dividing or formed between first and second sections 58,60 of the upper member. The first or upper section 58 is generally angled relative to the second or lower section 60. In the illustrated embodiment, the second section 60 is angled at about 30 degrees relative to the first section 58. The throughholes 48 are defined in the upper section 58 adjacent a leading edge 62 of the upper member 38. A recess 64, such as can be used to house a conventional vehicle brake light 68 (FIG. 2), is defined in the lower section 60 into a trailing edge 66 of the upper member 38.

As will be described in more detail below, a connection assembly or connecting means 70 is provided for attaching or securing the lower member to the upper member 38 along the trailing edge 66 thereof while allowing relative thermal expansive movement between the members 38,40. The connecting means 70 provides a tight connection between the members 38,40 which requires a sufficiently high force to pull the members 38,40 apart. The connection means 70 further provides for expected thermal expansion and thereby ensures that acceptable gap tolerances are maintained between the deflector assembly 10 and adjacent components.

Figure 4:
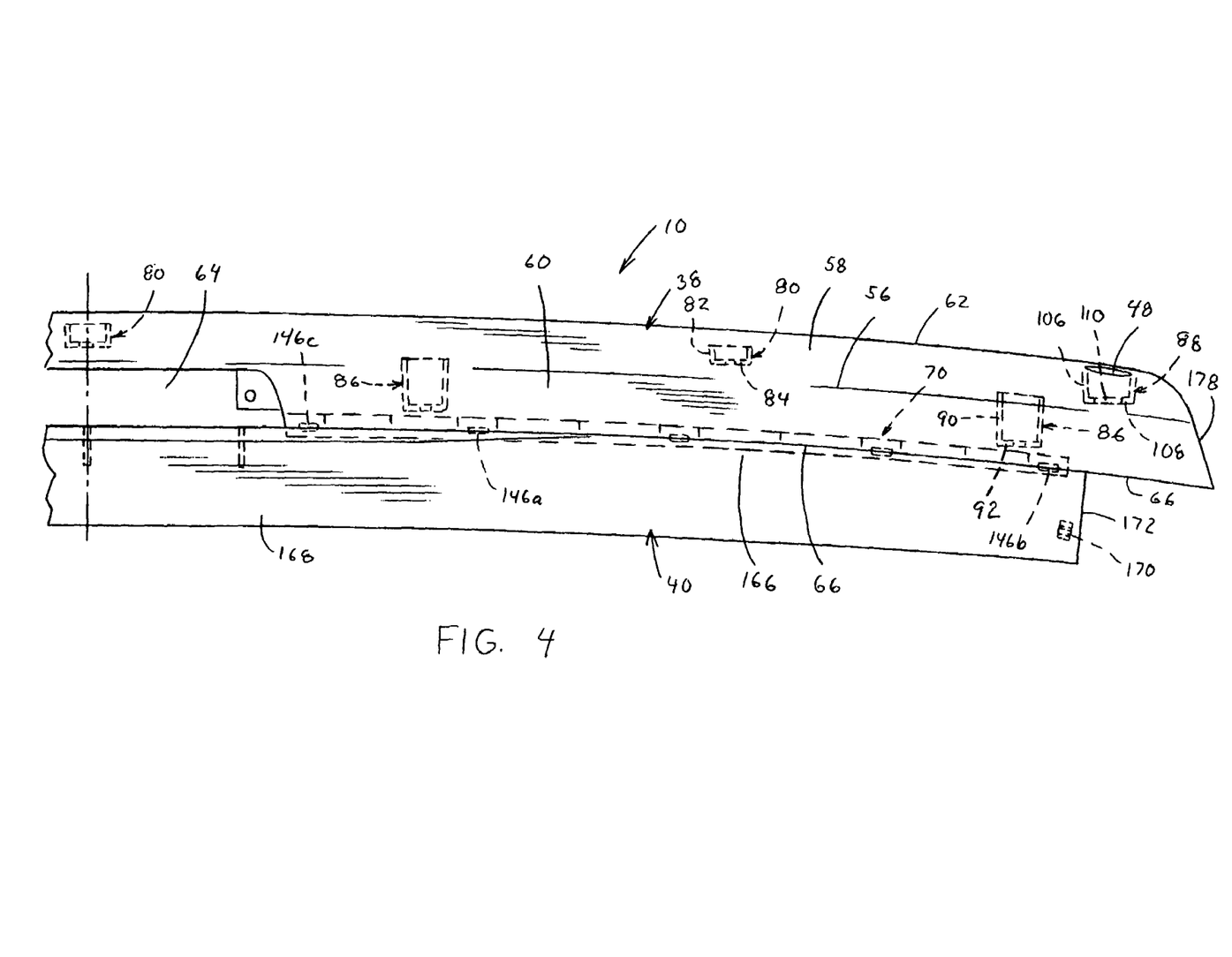
FIG. 4 is a partial rear elevational view of the vehicle deflector assembly.
Figure 5:
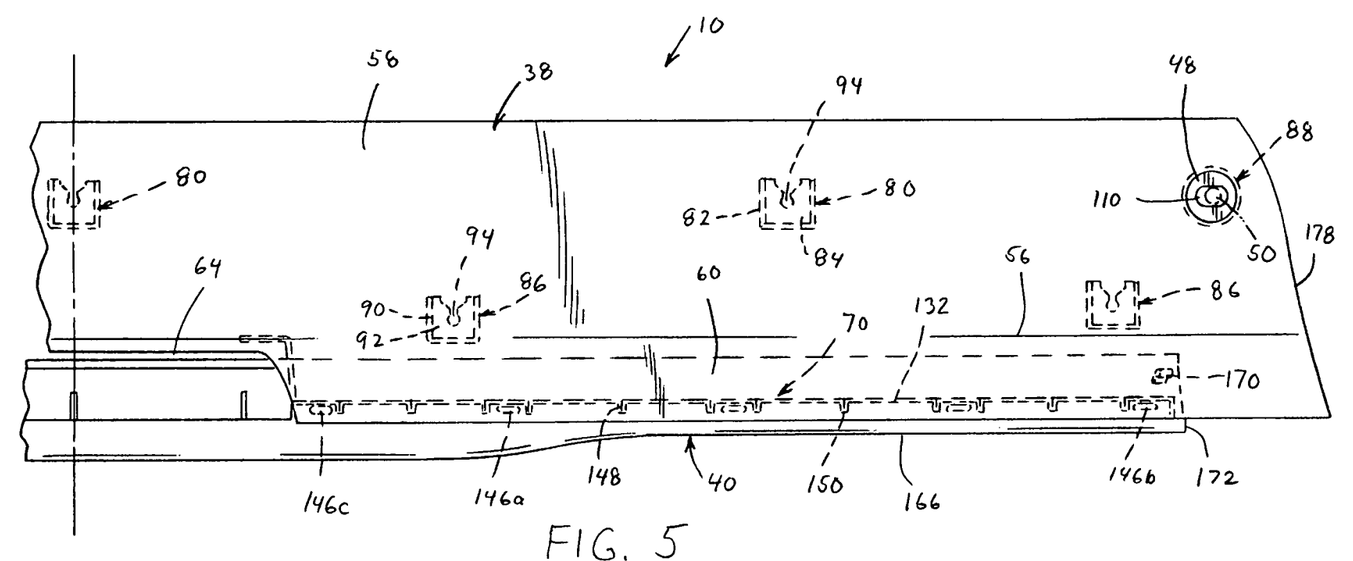
FIG. 5 is a partial plan view of the vehicle deflector assembly.
Figure 6:
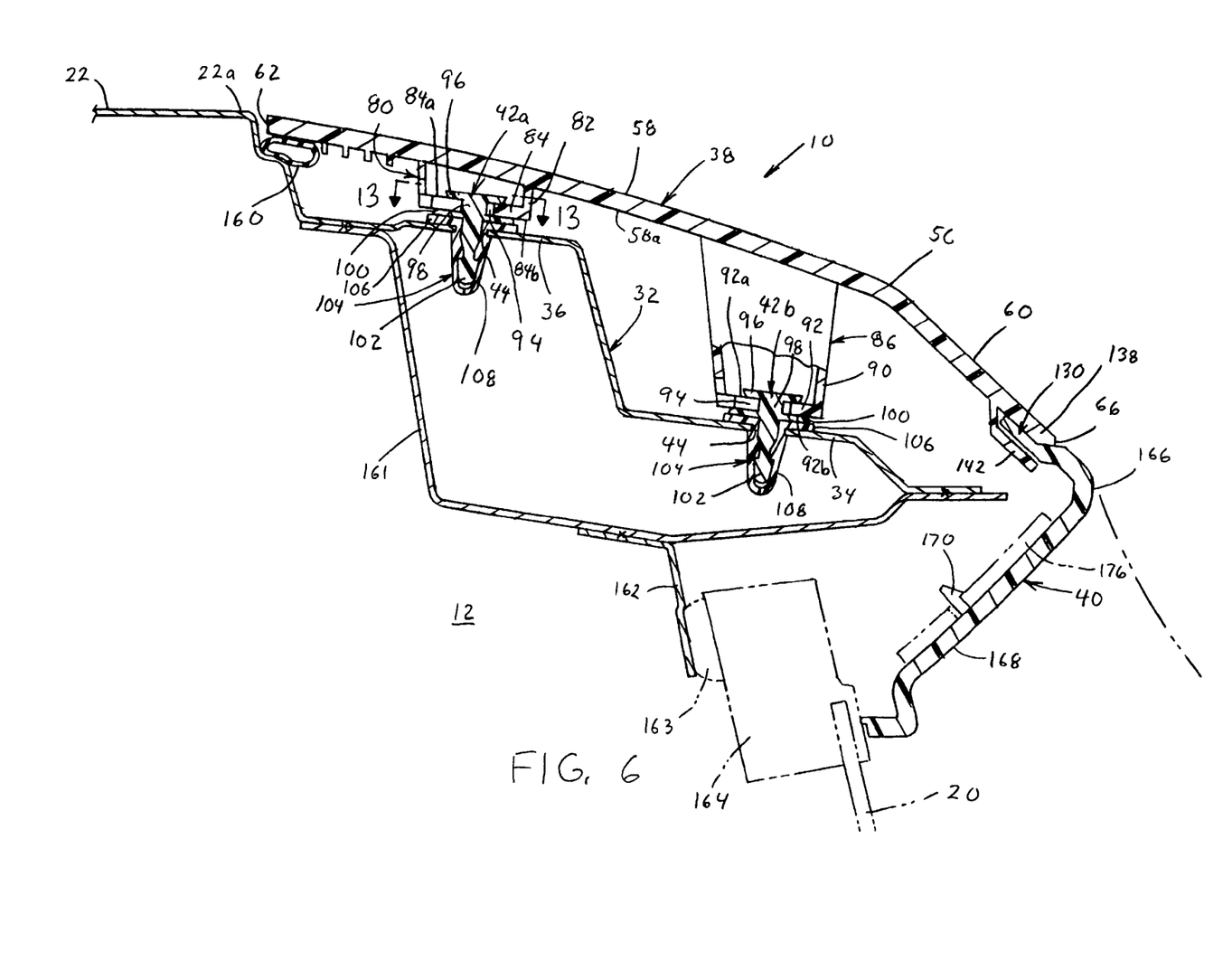
FIG. 6 is a cross-sectional view of the vehicle deflector assembly mounted to the truck taken along the line 6-6 of FIG. 1.

With additional reference to FIGS. 4-6, the upper member 38 includes upper step fastening structures 80 which enable upper step fasteners 42a to secure the upper member to the upper step 36. The structures 80 are spaced apart along a longitudinal extent of the upper member 38 and each includes walls 82 depending from an underside 58a of the first section 58 and a base wall 84 suspended or hung relative to the underside 58a by the walls 82. The length of the walls 82 positions the base wall 84 adjacent the upper step 36. The upper member 58 further includes lower step fastening structures 86 and bolt structures 88. The fastening structures 86 enable lower step fasteners 42b to secure the upper member 38 to the lower step 34. Like the structures 80, the lower step fastening structures 86 each include walls 90 depending from the first section underside 58a and a base wall 92 suspended or hung relative to the underside by the walls 90. The walls 90 are longer than the walls 82 of the upper step fastening structures 80 and, due to their length, position the base wall 92 of the structures 86 adjacent the lower step 34.

Figure 13:
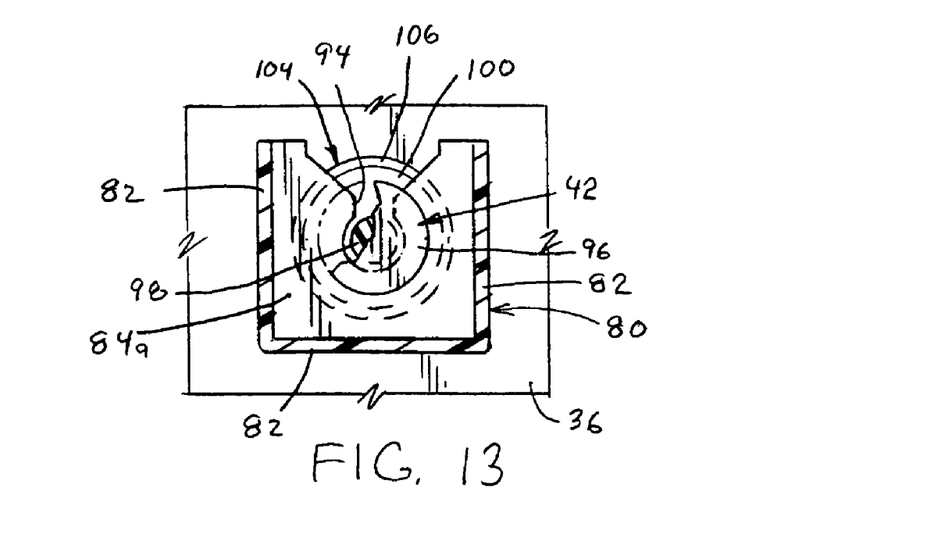
FIG. 13 is a partial cross-sectional view of a fastener structure of the deflector assembly secured to the sport utility truck by a fastener taken along the line 13-13 of FIG. 6.

In FIG. 13, a cross-section of one of the structures 80 shows a plan view of the base wall 84 and its corresponding fastener 42. The illustrated base wall 84 is representative of the base walls 84,92 of both the upper and lower step fastening structures 80,86. As shown, the fastener 42 is slidably received within a keyslot 94 defined in the base wall 84 and, with reference to FIGS. 6 and 13, connects the upper member 38 to the step 36. Each of the fasteners 42 includes a head 96 disposed at one end of a shaft portion 98. The shaft portion 98 is received through the keyslot 94 and the head portion rests adjacent or against a corresponding upper side 84a or 92a of the corresponding base wall. A radial flange 100 of each fastener 42 is axially spaced from the head 96 and rests adjacent or against a corresponding underside 84b or 92b. Thus, the base wall 84 is sandwiched between the radial flange 100 and the head 96.

A distal end portion 102 of the shaft portion 98 is snap-fit into a mounting anchor 104. The mounting anchor 104 includes a radial head 106 and an extending portion 108 that is itself snap-fit into the mounting holes 44. Prior to insertion of the fastener 42 into the mounting anchor 104, the anchor has some resiliency that allows it to be forced into its corresponding mounting hole 44. Once the fastener 42 is installed in the anchor 104, the resiliency is removed thereby securing the anchor to the stepped section 32. The configuration of the distal end portion 102, in combination with the mating configuration of the anchor extending portion 108, resists pull-out of the fastener 42 from the anchor 104 thereby securing the upper member 38 to the stepped portion 32. Of course, as will be appreciated by those skilled in the art, other types of fasteners and/or other connection means could be employed to secure the upper member 38 to the rear roof portion 22a and all other types of fasteners and/or connection means are to be considered within the scope of the described embodiment.

Figure 14:
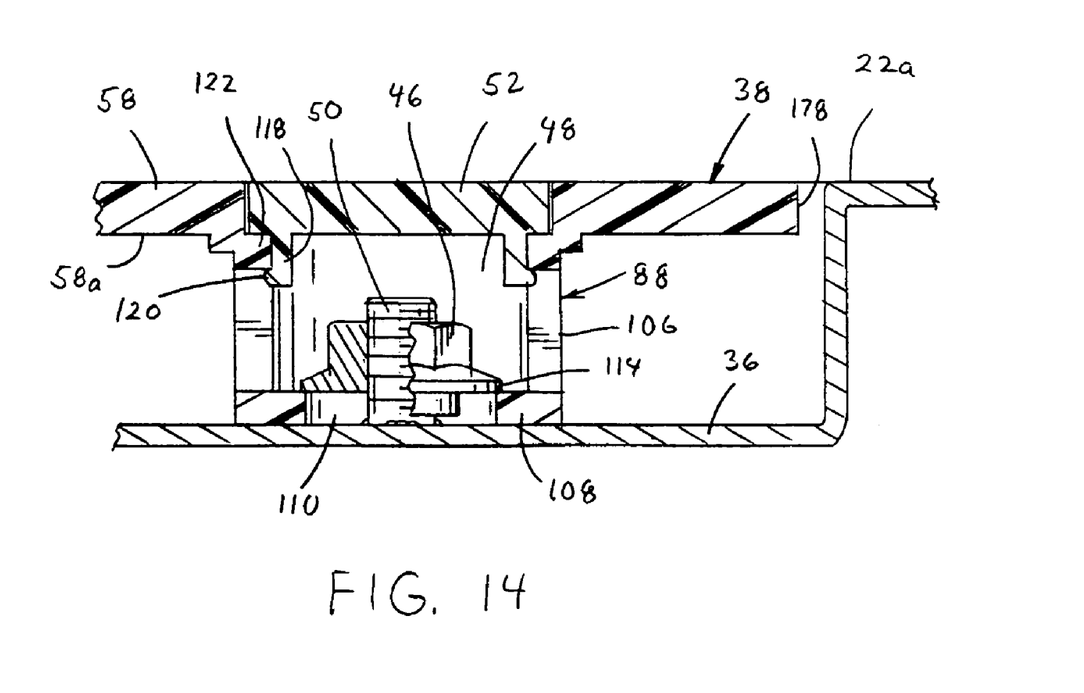
FIG. 14 is a cross-sectional view of the vehicle deflector assembly mounted to the truck taken along the line 14-14 of FIG. 1

With reference to FIG. 14, one of the bolt structures 88 and its surrounding elements are shown in cross-section. Like the fastener structures 80,86, the bolt structure 88 includes walls 106 depending from the underside 58a of the first section and a base wall 108 suspended or hung relative to the underside 58a by the walls 106. The walls 106 position the base wall 108 closely adjacent or in abutting contact with the upper step 36. The stud 50 which is welded to the upper step 36 is received through an oblong-shaped throughhole 110 defined in the base wall 108. The oblong-shaped throughhole 110 permits limited relative movement between the upper member 38 and the step 36 along a longitudinal length of the oblong hole 110 such as may be necessary for absorbing thermal expansion of the upper member 38. A flange 114 disposed on the nut 46 contacts the base wall 108. In the illustrated embodiment, the cap 52 includes skirt 118 having radial flange 120 for snap-fit engagement with cooperating flange portion 122 of the upper section 58 which limits axial pull-out of the cap 52 from the throughhole 48.

Figure 7:
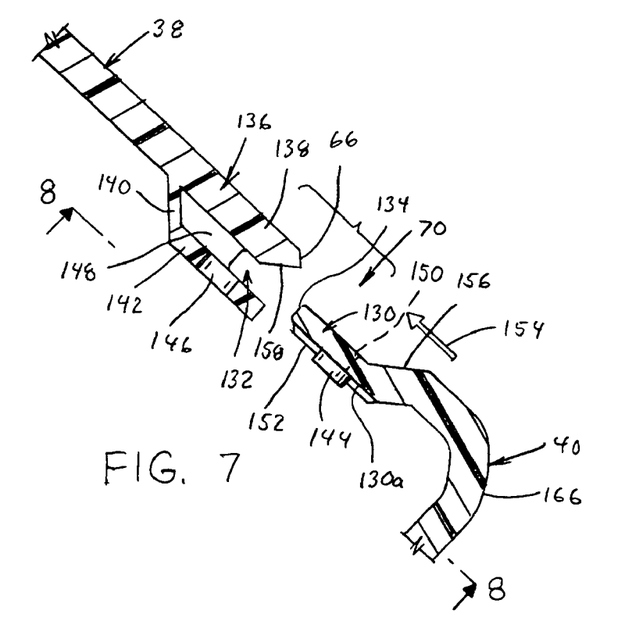
FIG. 7 is a partial exploded cross-sectional view of the upper and lower members of FIG. 6.

With reference to FIG. 7, the connecting means 70 enables the upper member 38 and the lower member 40 to be securely connected together. The connecting means 70 includes a tongue and groove system formed, in the illustrated embodiment, of a tongue section 130 of the lower member 40 which is received in a groove 132 defined in the upper member 38. Alternatively, a tongue section could be formed on the upper member 38 and a groove section could be formed on the lower member. In any case, the tongue and groove system serves to ensure sufficient rigidity in the assembled deflector assembly 10 and tight mating between the members 38,40 of the deflector assembly. Specifically, the tongue section 130 is substantially planar or flat and formed adjacent a leading edge 134 of the lower member 40. The groove or channel 132 is defined by a groove or channel section 136 formed adjacent trailing edge 66 of the upper section 38. The groove section 136 includes a substantially planar or flat wall portion 138 of the upper section 38, a groove width-defining wall 140 spaced from the trailing edge 66, and an opposed wall 142 spaced from the wall portion 138.

Figure 8:
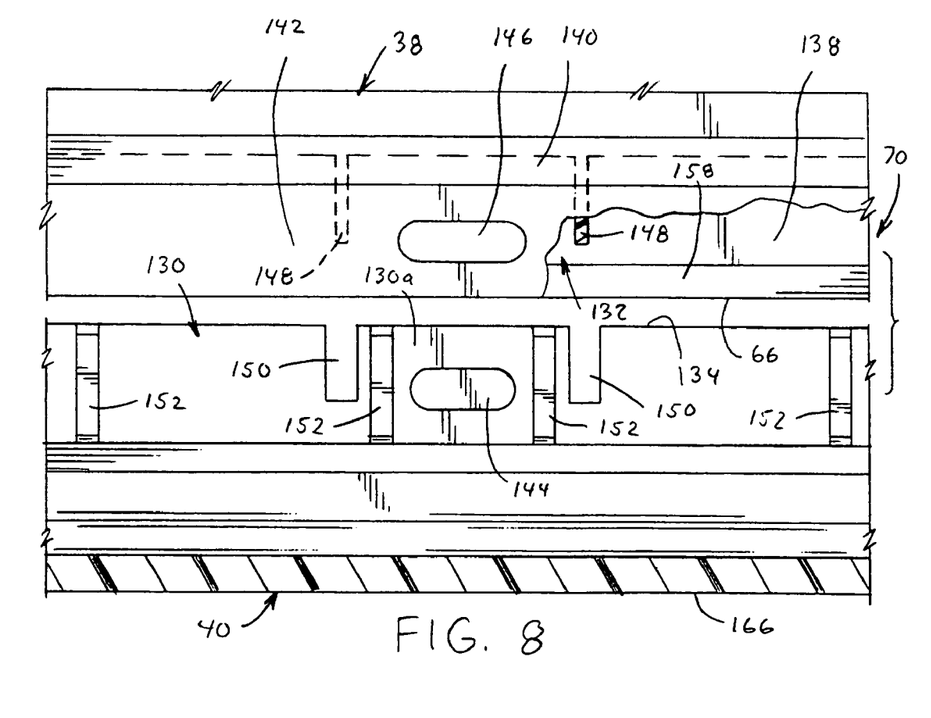
FIG. 8 is a cross-sectional view of the vehicle deflector assembly taken along the line 8-8 of FIG. 7.
Figure 9:
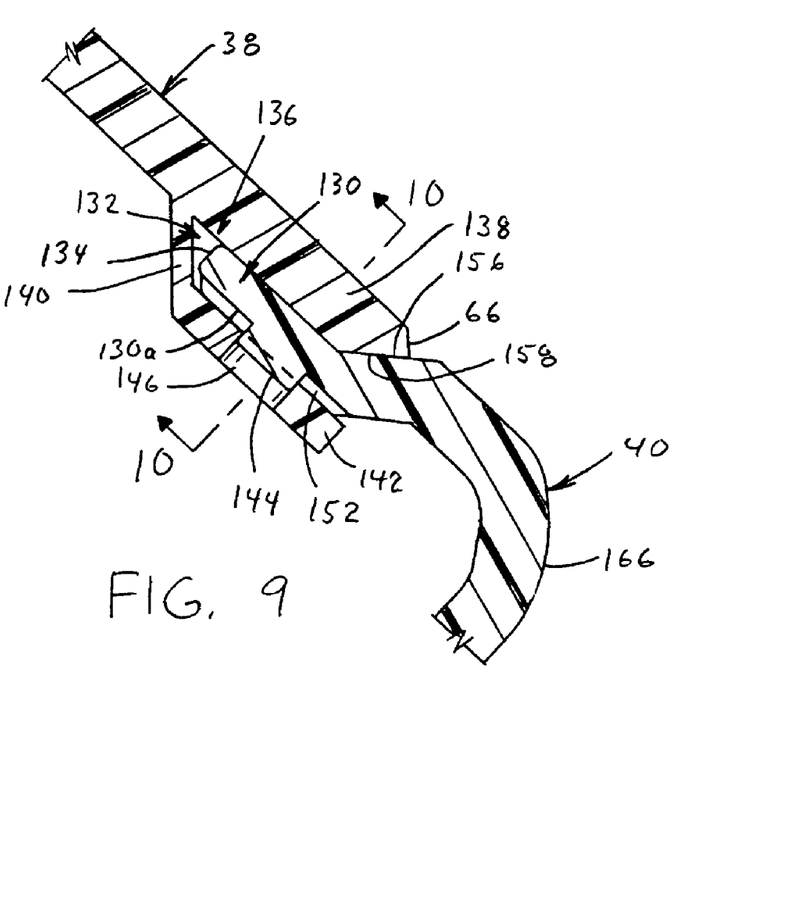
FIG. 9 is a partial cross-sectional view of the upper and lower members of FIG. 6.
Figure 10:
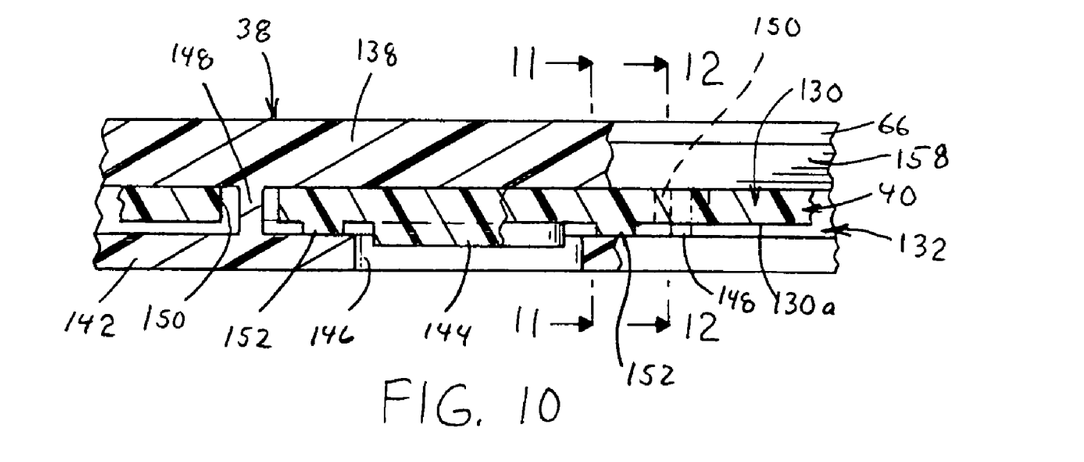
FIG. 10 is a cross-sectional view of the vehicle deflector assembly taken along the line 10-10 of FIG. 9.
Figure 11:
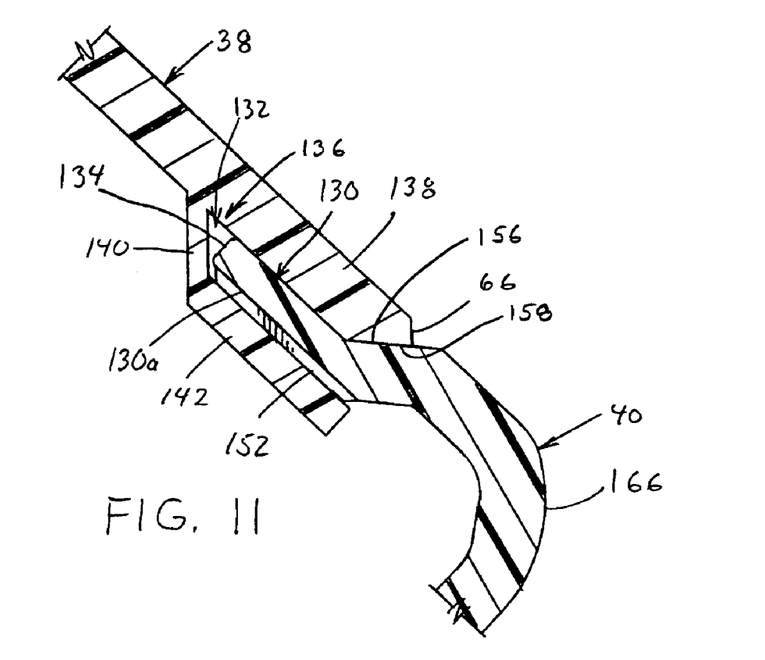
FIG. 11 is a cross-sectional view of the vehicle deflector assembly taken along the line 11-11 of FIG. 10.
Figure 12:
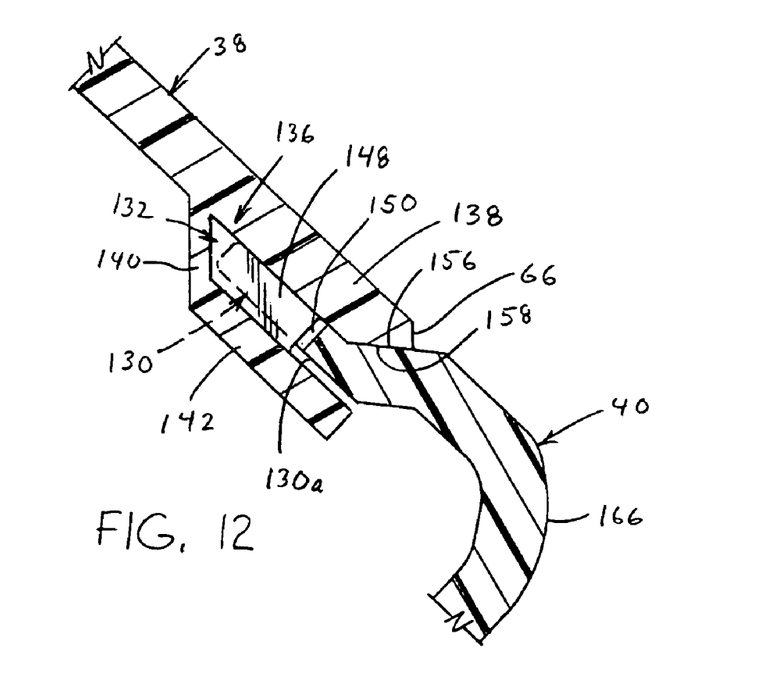
FIG. 12 is a cross-sectional view of the vehicle deflector assembly taken along the line 12-12 of FIG. 10.

With additional reference to FIGS. 3 and 8, the tongue section 130 includes a plurality of raised bosses 144 spaced apart along a longitudinal length of the lower section 40. Each boss 144 extends from a bottom surface 130a of the tongue section and is receivable in a corresponding slot or hole 146 defined in the wall 142 of the channel section 136. Alternatively, the raised bosses 144 could be provided on one of the walls 138, 140, 142 of the groove section 136 and the corresponding slots 146 could be provided on the tongue section 130.

Flanking both sides of each slot 146 are stiffening ribs 148 which each extend between the wall 142 and the wall portion 138. In addition to flanking sides of each slot 146, with additional reference to FIG. 5, a rib 148 is centrally positioned between all adjacent slots 146. The ribs 148 reinforce the channel section 136 and provide increased rigidity thereto. Notches 150 are defined in the leading edge 134 of the tongue section 130 at locations that correspond to the ribs 148 of the upper member 38. In the illustrated embodiment, the ribs 148 also extend from the wall 140 to a location spaced from the trailing edge 66 and the depth of each of the notches 150 matches or closely corresponds to the length of the ribs 148. Also flanking both sides of each boss 144 are touch off ribs 152 which extend from the bottom surface 130a a distance less than the bosses 144. As shown, the touch off ribs 150 can also be disposed at other locations between adjacent bosses 144, such as flanking either side of the centered ribs 148.

To assemble the deflector assembly 10 (i.e., to connect the upper and lower members 38,40 together), the tongue section 130 is moved into the groove 132 as indicated by arrow 154. With additional reference to FIGS. 9-12, when the tongue section 130 is fully received in the groove 132, the bosses 144 are snap-fit into the slots 146. When fully installed in the groove 132, an angled section 156 of the lower member 40 engages or mates with a tapered portion 158 of the wall 138. The stiffening ribs 148 are received in the notches 150. The touch off ribs 152 maintain a tight fit between the tongue section 130 and the groove section 136 and thereby control tightness between the assembled members 38,40. In the illustrated embodiment, the combined thickness of the tongue section 130 and the touch off ribs 152 is approximately the same or slightly smaller than the width of the groove 132. The receipt of the bosses 144 in the slots prevents or at least limits pull-out of the tongue section 130 from the groove section 136 without application of a sufficiently large force, such as a force greater than about 10 kgf.

Returning to FIGS. 6 and 14, the assembled deflector assembly 10 is mounted to the vehicle 12 using the fasteners 42 and nuts 46 as described above. A seal 160 is optionally provided along the leading edge 62 to seal between the upper member 38 and the rear roof portion 22a. In the illustrated embodiment, a reinforcing frame member 161 is secured to an underside of the stepped section 32 and a flange frame member 162 is secured thereto and is used for positioning or mounting of the rear cab window 20 through a seal 163 and/or window mounting member 164. Through the fasteners/nuts 42,46 and steps 34,36, the upper member 38 is mounted at a decreasing angle relative to the roof 22. Thus, the upper section 58 of the upper member is gradually angled relative to the roof 22 and the lower section 60 is more severely angled relative to the roof 22. Together, the sections 58,60 substantially cover and gradually follow the downward sloping contour of the stepped section 32 which hangs over the window 20.

The lower member 40 extends from the trailing edge 66 of the upper member 38 toward or to the window 20. More specifically, the lower member 40 includes a curved section 166 which redirects the remaining section 168 of the lower section toward the window 20. The section 168 includes clip connectors 170 located adjacent lateral ends 172, 174 of the lower member 40 (See also FIGS. 3-5) which secure the lower member 40 to an adjacent quarter pillar garnish members 176 shown schematically in FIG. 6. The clip connectors 170 operate to control fit between the deflector assembly 10 and the surrounding quarter pillar garnish members and to prevent, or at least limit, the lower member 40 from sagging.

Figure 15:
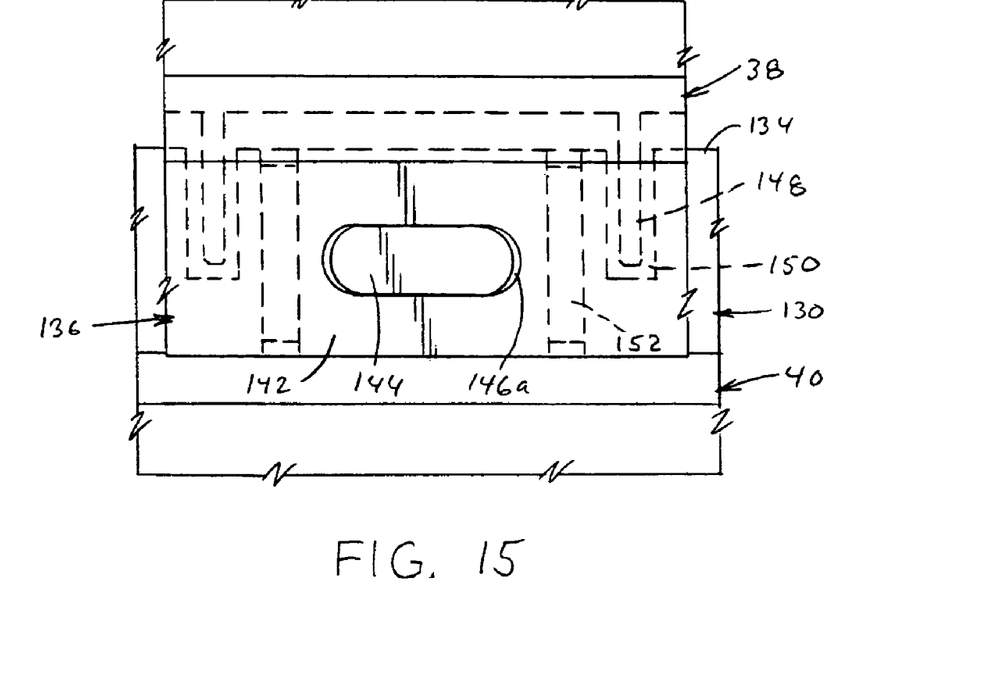
FIG. 15 is a partial plan view of one connection between the upper and lower members of the deflector assembly.
Figure 16:
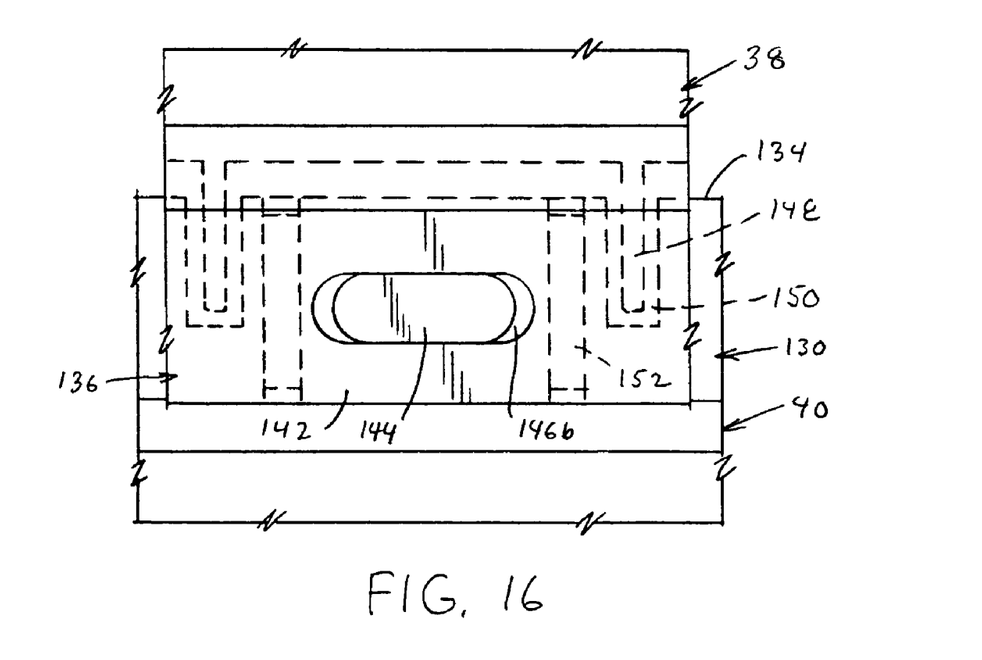
FIG. 16 is a partial plan view of another connection between the upper and lower members spaced toward a lateral edge of the lower member relative to the connection of FIG. 15.

To manage thermal expansion of the deflector assembly 10, the slots 146 in which the bosses 144 are received are progressively larger toward the lateral edges 178, 180 of the upper member 38. That is, with reference to FIG. 5, slot 146a more adjacent the recess 64 (and the slot 146c even more closely adjacent the recess 64) is smaller than slot 146b adjacent the lateral edge 178 and each slot 146 therebetween progressively increases in size toward the lateral edge 178. The same sizing relationship occurs in slots 146 between the recess 64 and the other lateral edge 180. With additional reference to FIGS. 15 and 16, the slot 146a is sized to more closely fit the boss 144 (i.e., the longitudinal length of the slot 146a is the same or only slightly larger than the longitudinal length of the boss 144 received therein). In contrast, the slot 146b is sized to be greater than the boss 144 to allow for thermal expansion and movement of the upper member 38 (i.e., the longitudinal length of the slot 146b is significantly larger than the longitudinal length of the boss 144 received therein).

In the illustrated embodiment, the bosses 144 remain substantially the same size from the recess 64 toward the lateral edges 178, 180. Alternately, the bosses 144 could be configured to be progressively smaller from the recess 64 toward the lateral edges 178, 180 with the slots 146 remaining of one size or the slots and bosses could together change in size from the recess toward the lateral edges. For example, the bosses 144 could progressively decrease in size while the slots 146 progressively increase in size. In the illustrated embodiment, the notches 150 are sufficiently sized to allow for thermal expansion of the upper member 38 and movement of the stiffening ribs 148 within the notches 150. Of course, as will be appreciated by those skilled in the art, the notches could be formed to more closely fit around the stiffening ribs with progressive sizing toward the lateral edges employed to provide for thermal expansion.

Once assembled and mounted to the truck 12, the deflector assembly 10 directs airflow over the bed 16 and reduces the amount of turbulence generated by air passing over the roof 22 and into the bed 16 when the vehicle 12 is in transit, particularly at relatively higher speeds, such as highway speeds. Rather than airflow entering the bed over a sharp corner, airflow is subtly directed over and to the bed. The deflector assembly also serves as a rear roof garnish assembly improving the aesthetics of the truck 12, particularly where the rear roof portion 22a intersects with the wall 18 and window 20.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle deflector assembly, comprising:
a first member and second member with at least one of said first and second members secured to an associated vehicle, both said first and second members extending along a substantial portion of a width of the vehicle;
a connecting assembly connecting said first and second members together while allowing relative thermal expansive movement therebetween;
a tongue section formed on one of said first member and said second member;
a groove formed in the other of said first member and said second member; and
wherein said connecting assembly further includes touch off ribs disposed on said tongue section for tightly fitting said tongue section into said groove.

2. A vehicle deflector assembly, comprising:
a first member and second member with at least one of said first and second members secured to an associated vehicle, both said first and second members extending along a substantial portion of a width of the vehicle; and
a connecting assembly connecting said first and second members together while allowing relative thermal expansive movement therebetween,
wherein the deflector assembly is mounted to a rear roof portion of a sport utility truck and directs airflow over a load-carrying bed portion of the sport utility truck.

3. The vehicle deflector assembly of claim 2, wherein said connecting assembly includes a tongue and groove system for providing sufficient rigidity and tight mating to the first and second members.

4. The vehicle deflector assembly of claim 2 wherein said connecting assembly includes:
a tongue section formed on one of said first member and said second member; and
a groove formed in the other of said first member and said second member.

5. The vehicle deflector assembly of claim 4 wherein said groove is formed in said first member which forms an upper member that is secured to said vehicle and said tongue section is formed in said second member which forms a lower member.

6. The vehicle deflector assembly of claim 5 wherein said connecting assembly further includes:
a slot defined in a groove portion of said upper member defining said groove; and
a raised boss disposed on a tongue section and received in said slot.

7. The vehicle deflector assembly of claim 4 wherein a plurality of slots are defined in said groove, a plurality of stiffening ribs are disposed in said slots, and said tongue section includes corresponding notches that receive said plurality of stiffening ribs.

8. The vehicle deflector assembly of claim 7 wherein said notches are sufficiently sized to permit movement of said stiffening ribs caused by thermal expansion.

9. The vehicle deflector assembly of claim 4 wherein said connecting assembly further includes touch off ribs disposed on said tongue section for tightly fitting said tongue section into said groove.

10. The vehicle deflector assembly of claim 2 wherein said first member has a first section and a second section angled relative to said first section by about thirty degrees.

11. A vehicle deflector assembly, comprising:
a first member and second member with at least one of said first and second members secured to an associated vehicle, both said first and second members extending along a substantial portion of a width of the vehicle; and
a connecting assembly connecting said first and second members together while allowing relative thermal expansive movement therebetween,
wherein the deflector assembly is mounted adjacent an intersection between a roof of a vehicle and a rear window of the vehicle.

12. The vehicle deflector assembly of claim 11 wherein said first member extends from said roof and hangs over said rear window and said second member connects to a trailing end of said first member and curves back toward said window.

13. The vehicle deflector assembly of claim 11 wherein a plurality of fasteners secure said first member to the vehicle, said fasteners slidably engage to said first member and snap fit into anchors mounted to the vehicle, said snap fit between said fasteners and said anchors prevents said anchors from disconnecting from the vehicle.

14. The vehicle deflector assembly of claim 11 wherein the connecting assembly connects said first and second members together without the use of fasteners.

15. The vehicle deflector assembly of claim 11 wherein said connecting assembly includes:
a tongue section formed on one of said first member and said second member; and
a groove formed in the other of said first member and said second member.

16. The vehicle deflector assembly of claim 15 wherein said connecting assembly includes:
a plurality of slots defined in said groove; and
a corresponding plurality of raised bosses disposed on said tongue section and received in said plurality of slots, wherein said plurality of slots and said corresponding plurality of raised bosses progressively change in size along said first and second members to accommodate thermal expansion.

17. The vehicle deflector assembly of claim 15 wherein a plurality of slots are defined in said groove, a plurality of stiffening ribs are disposed in said slots, and said tongue section includes corresponding notches that receive said plurality of stiffening ribs.

18. The vehicle deflector assembly of claim 17 wherein said notches are sufficiently sized to permit movement of said stiffening ribs caused by thermal expansion.

19. A vehicle deflector assembly, comprising:
a first member and second member with at least one of said first and second members secured to an associated vehicle, both said first and second members extending along a substantial portion of a width of the vehicle; and a connecting assembly connecting said first and second members together while allowing relative thermal expansive movement therebetween, wherein one of said first and second members includes a recess for housing a brake light.

20. A vehicle deflector assembly mounted on the roof of a vehicle for directing airflow over a load-carrying bed portion of the vehicle, the deflector assembly comprising:

an upper member mounted to the roof of the vehicle and having a groove defined along one end thereof;

a lower member having a tongue defined along one end thereof that is receivable in said groove for connecting said lower member to said upper member; and a plurality of bosses extending from and spaced along a longitudinal length of said tongue, said bosses receivable in corresponding slots defined in said upper member adjacent said groove, at least one of said bosses and said grooves progressively dimensioned toward lateral edges of said upper and lower members.

21. The vehicle deflector assembly of claim 20 further including stiffening ribs disposed in said groove to increase the rigidity of said upper member.

22. The vehicle deflector assembly of claim 21 further including notches defined in said tongue that receive said stiffening ribs when said tongue is received in said groove.

23. The vehicle deflector assembly of claim 21 wherein said stiffening ribs are positioned at least one of adjacent each side of said slots and centered between adjacent slots.

24. The vehicle deflector assembly of claim 21 further including:

touch off ribs extending from said tongue for positioning said tongue in said groove, a combined width of said tongue and said touch off grooves substantially matching a width of said groove.

25. The vehicle deflector assembly of claim 24 wherein said touch off ribs are positioned at least one of adjacent each side of said bosses and adjacent slots defined in said tongue that receive said stiffening ribs when said tongue is received in said groove.

26. A rear roof garnish assembly, comprising:

an upper member secured to a rear portion of a vehicle's roof;

a lower member;

a connecting means for securing said lower member to said upper member, said connecting means including:

a tongue section formed along an edge of one of said upper member and said lower member, a groove section defining a groove formed along an edge of the other of said upper member and said lower member, said groove receiving said tongue section therein, raised bosses formed on one of said tongue section and said groove section, and slots formed in the other of said tongue section and said groove section receiving said raised bosses.

27. The rear roof garnish assembly of claim 26 wherein said slots are progressively sized to accommodate thermal expansive movement of said bosses.

* * * * *